United States Patent [19]

Newbold

[11] Patent Number: 5,299,818
[45] Date of Patent: Apr. 5, 1994

[54] CHILD'S BICYCLE SEAT AND RACK ASSEMBLY

[75] Inventor: Dixon Newbold, Glocester, R.I.

[73] Assignee: Bell Sports, Inc., Providence, R.I.

[21] Appl. No.: 415,174

[22] Filed: Sep. 29, 1989

[51] Int. Cl.⁵ .............................................. B62J 11/00
[52] U.S. Cl. ............................... 280/202; 280/288.4; 224/32 A; 297/363
[58] Field of Search ................... 280/202, 288.4, 304.5, 280/31, 32.7, 290, 33.993, 658, 30, 642, 643, 644, 657, 47.4; 224/32 A, 32 R, 31, 33 R, 39; 297/250, 255, 396, 363, 366, 243, DIG. 9; 403/384

[56] References Cited

U.S. PATENT DOCUMENTS

| | | | |
|---|---|---|---|
| 3,138,400 | 6/1964 | Reid | 297/363 |
| 3,902,737 | 9/1975 | Berger et al. | 280/202 |
| 4,030,648 | 6/1977 | Johnson et al. | 280/202 |
| 4,053,091 | 10/1977 | Martelet | 224/32 A |
| 4,154,382 | 5/1979 | Blackburn | 224/39 |
| 4,440,331 | 4/1984 | Schimmels | 280/202 |
| 4,592,592 | 6/1986 | Peek | 297/284 |
| 4,753,482 | 6/1988 | Warren | 297/284 |
| 4,861,105 | 8/1989 | Merten et al. | 280/33.993 |
| 4,964,551 | 10/1990 | O'Donovan et al. | 224/32 A |
| 4,998,744 | 3/1991 | Drexler | 280/202 |
| 5,028,061 | 7/1991 | Hawkes | 280/642 |
| 5,069,474 | 12/1991 | Tai | 280/47.4 |

FOREIGN PATENT DOCUMENTS

| | | | |
|---|---|---|---|
| 0011894 | 5/1912 | United Kingdom | 280/202 |
| 2136685 | 9/1984 | United Kingdom | 297/250 |
| 2163478 | 2/1986 | United Kingdom | 280/643 |

OTHER PUBLICATIONS

"Rhode Gear Child Seat and Rack" advertisement Summer 1990 L.L. Bean Catalog.

Primary Examiner—David M. Mitchell
Assistant Examiner—A. M. Boehler
Attorney, Agent, or Firm—Wolf, Greenfield & Sacks

[57] ABSTRACT

A novel child's bicycle seat/rack assembly is provided. The seat is capable of slidable attachment to a touring rack of the type including a substantially rectangular frame formed from struts. The seat has integrally-formed channels for slidably engaging the struts and forward and rear integrally-formed, latches adapted to releasably engage the struts so as to lock the seat member against rearward movement relative to the rack. A locking wedge is provided to secure a latch against unintentional flexing and disengagement from the strut. A child's seat may have a seat portion and a back portion pivotably attached to one another by a pair of axially aligned, hub assemblies.

22 Claims, 7 Drawing Sheets

CHILD'S BICYCLE SEAT AND RACK ASSEMBLY

BACKGROUND OF THE INVENTION

This invention relates to a child's bicycle seat of the type adapted to be supported on a bicycle rack attached to the frame of a bicycle and supported over a wheel.

Numerous child's bicycle seat and rack assemblies are known in the prior art. Nearly all involve seats which are bolted to rack elements, disengagement of the seat from the rack being troublesome and time consuming. Many of the existing assemblies do not even contemplate the use of the rack without the seat. One rack, that shown in U.S. Pat. No. 4,030,648, shows a seat adapted for sliding engagement with a rack, the seat being snap locked into engagement with the rack. The rack, however, is specially designed and requires a biased element integrally formed in its solid flat platform and an overhang of the platform relative to the side supports for interengagement with a channel in the seat.

SUMMARY OF THE INVENTION

It is an object of the invention to provide a child seat that quickly and easily may be detachably secured to a bicycle rack, and in particular, a standard touring rack of the type formed of metal rods or struts.

Another object of the invention is to provide a bicycle seat/rack assembly having a secure seat to rack locking mechanism which is easily and quickly disengaged without removing the rack.

Yet another object of the invention is to provide an improved bicycle seat/rack assembly which allows easy adjustment of the backrest relative to the seat portion.

Still another object of the invention is to provide a bicycle seat of the foregoing type that is simple to manufacture, the rack engagement mechanisms being integrally formed as a part of the bottom of the bicycle seat.

These and other objects are achieved by the invention which provides a novel child s bicycle seat capable of slidable attachment to a standard touring rack of the type including a substantially rectangular frame having two side struts, a front end strut and a rear end strut. The seat has channels integrally formed in the seat bottom for slidably engaging the side struts and securing the seat against lateral and vertical movement relative the rectangular frame. The seat also has an integrally formed, biased latch adapted to releasably engage one of the front and rear end struts so as to lock the seat member against rearward movement relative to the rack. The biased latch may engage the rear end strut, the front end strut or both. In one aspect of the invention, the biased latch depends downwardly from the bottom of the seat to disengagingly lock with the rear end strut. A locking wedge may be secured between the biased latch and the seat bottom to secure the biased latch in its normally biased position thereby preventing unintentional flexing and disengagement between the latch and the rear end of the strut. When the wedge is removed, the latch may be flexed out of engagement with the rear end strut to allow the seat to be slid rearwardly from the rack.

In another aspect of the invention, a tongue is integrally formed with and projects forwardly of the seat. A biased latch member may be formed in this tongue and be adapted to releasably engage the front end strut so as to lock the seat against rearward movement with respect to the rack. Preferably, the front end strut forms a slot for snugly mating with the tongue to additionally limit forward and vertical movement of the seat with respect to the rack.

In yet another aspect of the invention, the seat bottom includes a pair of L-shaped channels for engaging the side struts of the rack. The rack has a pair of end support struts attached to and downwardly depending from the rear end strut, the support struts being attached inwardly of the side struts to provide clearance for the L shaped channels.

In yet another aspect of the invention, the child's bicycle seat has a seat portion and a backrest portion pivotably attached to one another by a pair of axially aligned, hub assemblies. The hub assemblies have facing hubs with mating projections and grooves. The hubs may be rotated with respect to one another and locked in various rotational relationships for selectively securing the backrest and seat in various angular relationships to one another. Preferably, the hub assemblies include seat hubs with integrally formed, radially extending arms and backrest hubs with integrally formed, radially extending arms. The seat and backrest arms mate with channels formed in the side walls of the seat portion and backrest to secure the seat portion and backrest to the hub assemblies.

The seat portion, backrest and individual hubs all may be injection molded to provide for easy manufacture and assembly of the seat.

DETAILED DESCRIPTION OF THE PREFERRED EMBODIMENT

Figure 1:
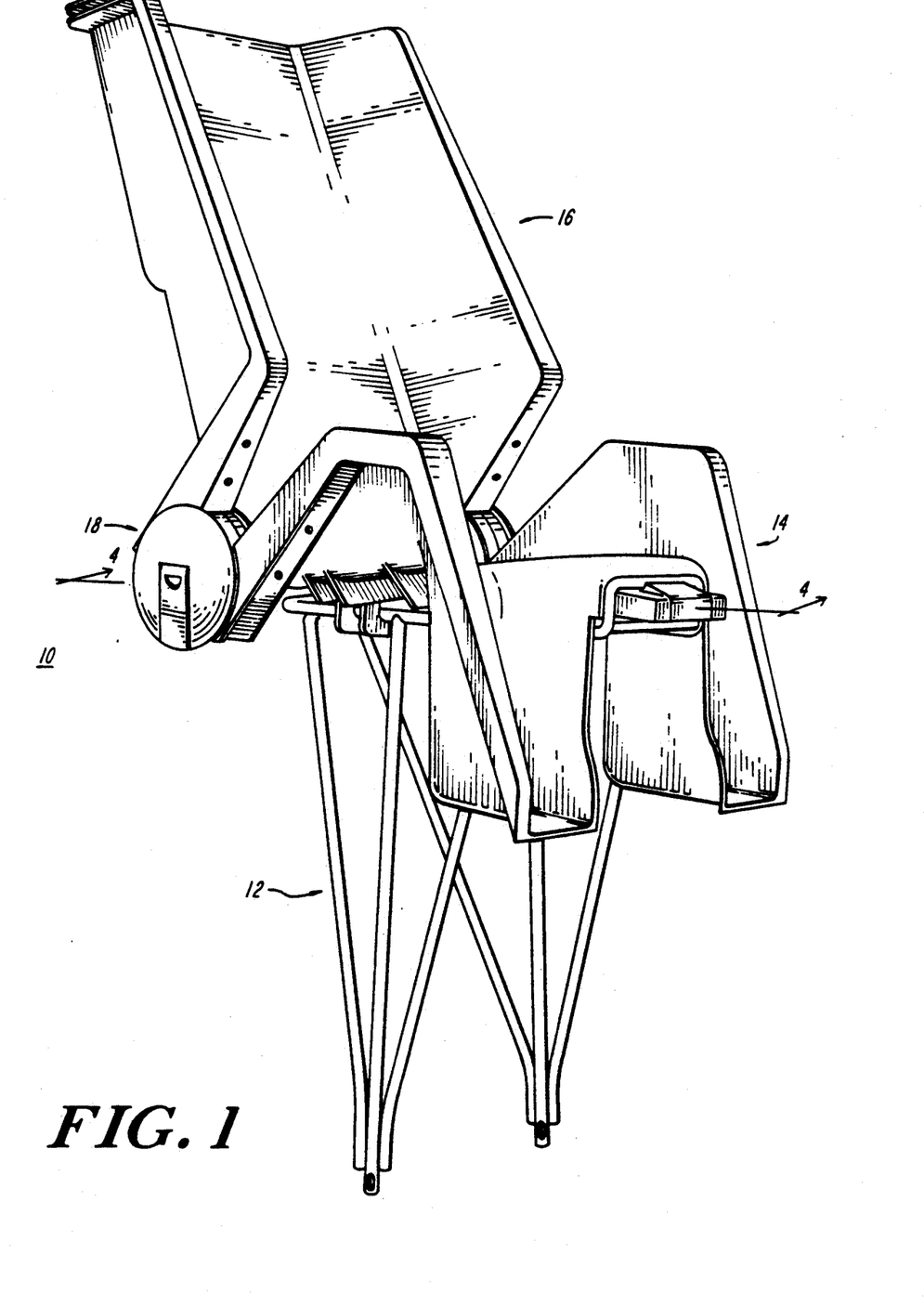
FIG. 1 shows the preferred embodiment of the child's bicycle seat of the invention assembled onto a touring rack.

The preferred embodiment of the child's bicycle seat/rack assembly is depicted in FIG. 1. The assembly includes a seat generally designated 10 and a rack 12 to which the seat is attached. The seat 10 includes a lower seat portion 14 pivotably attached to a backrest 16 by a hub assembly 18. The seat portion 14 includes a horizontal base 20 and base side walls 22 integrally formed with the base and extending substantially perpendicularly to the base 20. The base side walls 22 are substantially in the shape of a trapezoid. A U shaped reinforcing channel 24 is integrally formed with and defines the edge of each of the side walls 22. Toward the rearwardly facing end of the base 20, the edges of the base side walls 22 slope downwardly. The rearward ends of the U-shaped reinforcing channels 24 are cut-out providing first arcuate grooves 34 for mating with the hub assemblies 18.

A pair of spaced-apart, leg receiving-channels 26 are integrally formed with the seat 10 and depend downwardly from the forward end of the base 20. Extending from the center of the forward end of the base 20 is an integrally formed tongue 28. The tongue 28 includes an integral forward latch 30 depending in its normal, unbiased position upwardly from the top surface 32 of tongue 28. This forward latch 30 may be deflected downwardly upon application of force to become substantially flush with the top surface 32 of the tongue 28.

The seat portion 14 also includes a pair of integral, L-shaped channels 35 depending downwardly from the bottom of the seat portion 14. These channels 35 are constructed and arranged so that they will slideably engage the rack 12, as will be more fully described below.

The backrest 16 includes a back wall 36 and backrest side walls 38. The backrest side walls 38 are integrally formed with the back wall 36 and extend substantially perpendicularly to the back wall 36. The backrest side walls 38 also include integral, U-shaped, reinforcing channels 24 defining the edge of the backrest side walls 38. The lower edge of the backrest side walls 38 are cut-out to form second arcuate grooves 42 for mating with the hub assemblies 18. The upper ends of the backrest side walls 38 and of the back wall 36 define a peripheral, reinforcing, double flange 40. This double flange 40 provides additional reinforcing support to the backrest.

Figure 2:
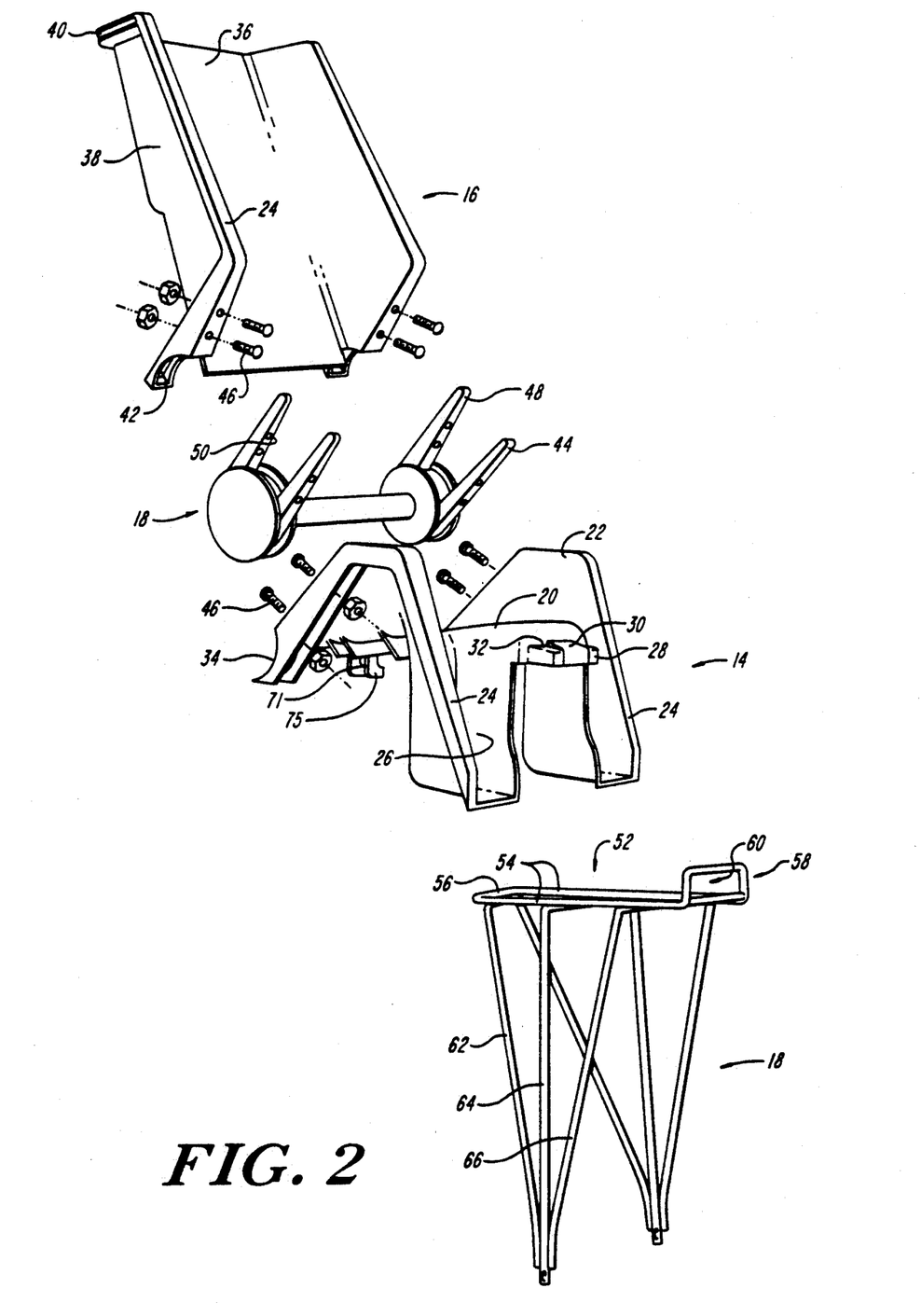
FIG. 2 is a partially exploded representation of FIG. 1.

The seat portion 14 and backrest 16 are attached to one another by a pair of axially aligned hub assemblies 18. Each hub assembly 18 includes a seat hub and a backrest hub capable of selective rotation with respect to one another. Each seat hub has extending radially therefrom an integrally formed, seat engaging arm 44. The seat engaging arms 44 are positioned within and securely attached to the U-shaped, reinforcing channels 24 of the seat portion 14 via bolts 46. Each backrest hub similarly includes an integrally formed, backrest engaging arm 48. These arms 48 are positioned within and securely attached to the U-shaped reinforcing channels 24 of the backrest 16 via bolts 46. The seat and backrest engaging arms 44, 48 and the U-shaped, reinforcing channel 24 are provided with mating holes 50 through which the bolts 46 are received.

The rack 12 is of the conventional touring type. The rack 12 includes a first set of struts forming a horizontal platform, generally designated as 52. The horizontal platform includes side struts 54 attached to one another at opposing ends by a rear end strut 56 and a front end strut 58. The front end strut 58 preferably is formed in the shape of a rectangle extending upwardly and perpendicularly to the plane defined by the horizontal platform 52, thereby defining rectangular slot 60. The rack 12 also includes three pairs of struts attached to and downwardly depending from the horizontal platform 52 for interengagement with the bicycle frame to support the rack 12. The rear support struts 62 are attached to the rear end strut 56 inwardly of the side struts 54 to provide clearance for the L shaped channels 35 when the seat 10 is slid onto the rack 12. A pair of central support struts 64 are attached to and depend downwardly from the mid region of the side struts. A pair of front support struts 66 are attached to and depend downwardly from the side struts 54 forward of the central support struts 64. The three pair of support struts are attached to one another at their lower extremities. The foregoing rack is known in the prior art and by itself does not form a part of the invention.

Figure 3:
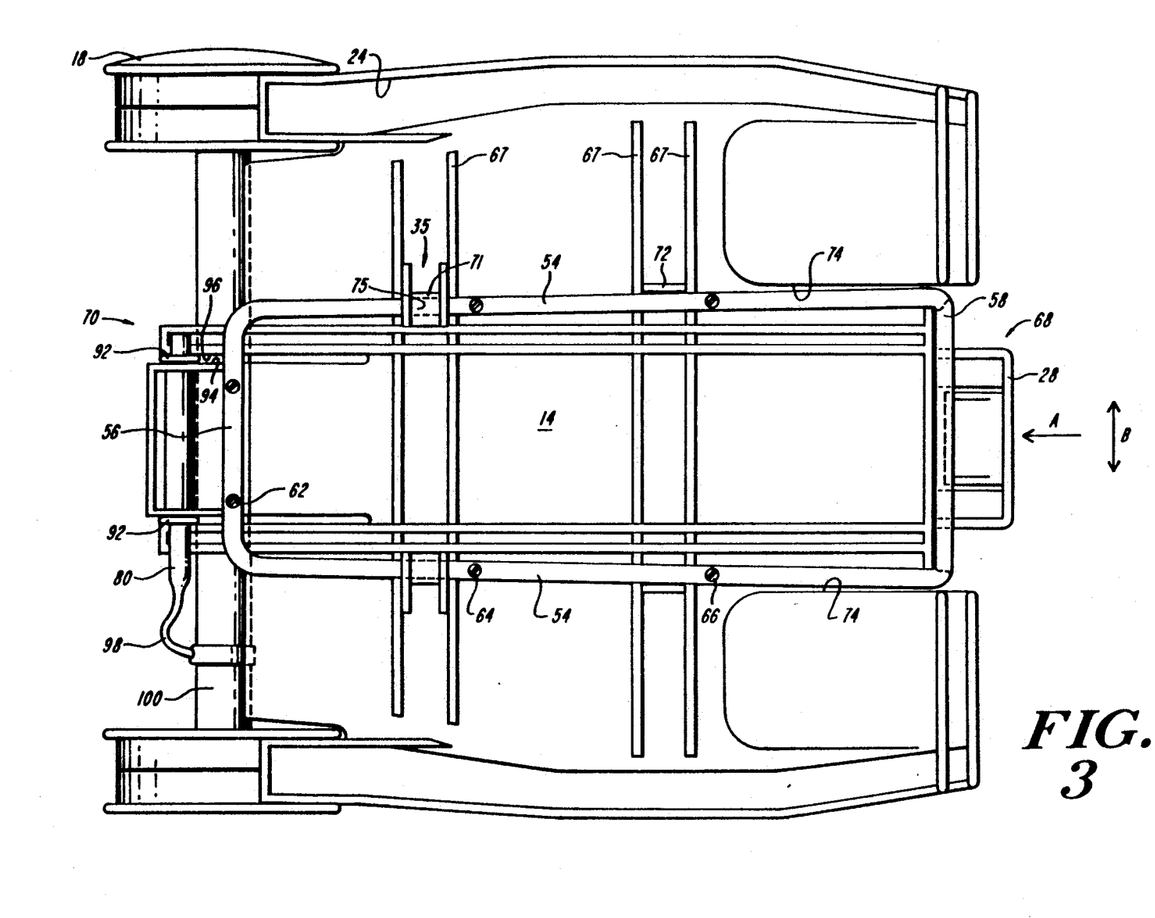
FIG. 3 is a bottom view of the seat/rack assembly of FIG. 1.

FIG. 3 illustrates the attachment of the horizontal platform 52 of the rack 12 to the bottom of the seat portion 14. To provide for better illustration of this attachment, the horizontal platform 52 is only partially depicted, the rear support struts 62, central support struts 64 and front support struts 66 cut-off close to their point of attachment to the horizontal platform 52. The bottom of the seat is shown as having a plurality of integrally formed support ribs 67 for providing structural support and additional strength to the seat portion 14. Such ribs 67 are conventional and do not form a part of the invention.

The seat portion 14 is detachably secured against rearward movement (arrow A) with respect to the rack 12 by a front locking mechanism 68 and a rear locking mechanism 70. The seat portion 14 is restricted against lateral movement (arrow B) with respect to the rack 12 by the engagement of the side struts 54 with the side portion 71 of the L shaped channels 35, the projecting buttresses 72 and the facing walls 74 of the leg receiving channels 26, all of which are integrally formed with the seat portion 14. The seat portion 14 is restricted against vertical movement with respect to the horizontal platform by the engagement of the bottom portion 75 of the L shaped channels 35 with the side struts 54 and by the engagement of the tongue 28 with the front strut 58.

The front locking mechanism 68 and the rear locking mechanism 70 may be disengaged from the front end strut 58 and rear end strut 56 respectively, and then the seat portion 14 may be slid rearwardly in direction of arrow A with respect to the rack 12. The L-shaped channels 35 which engage the side struts 54 are capable of sliding off the rearward end of the rack 12 because the rear support struts 62 are attached to the rear end strut 56 inwardly of the side struts 54 to provide clearance for the bottom portions 7 of the L shaped channels 35 as the seat is slid off the rack. Without this clearance, the bottom portion 75 of the L-shaped channels 35, which bottom portions 75 extend inwardly of the side struts 54, would contact the rear support struts 62 and prevent the seat from being slid onto and off of the rack. The L-shaped channels 35 are positioned on the bottom of the seat portion 14 such that when the rack 12 and seat portion 14 are locked to one another, the L-shaped channels 35 engage the side struts 54 rearwardly of the central support struts 64.

Figure 4:
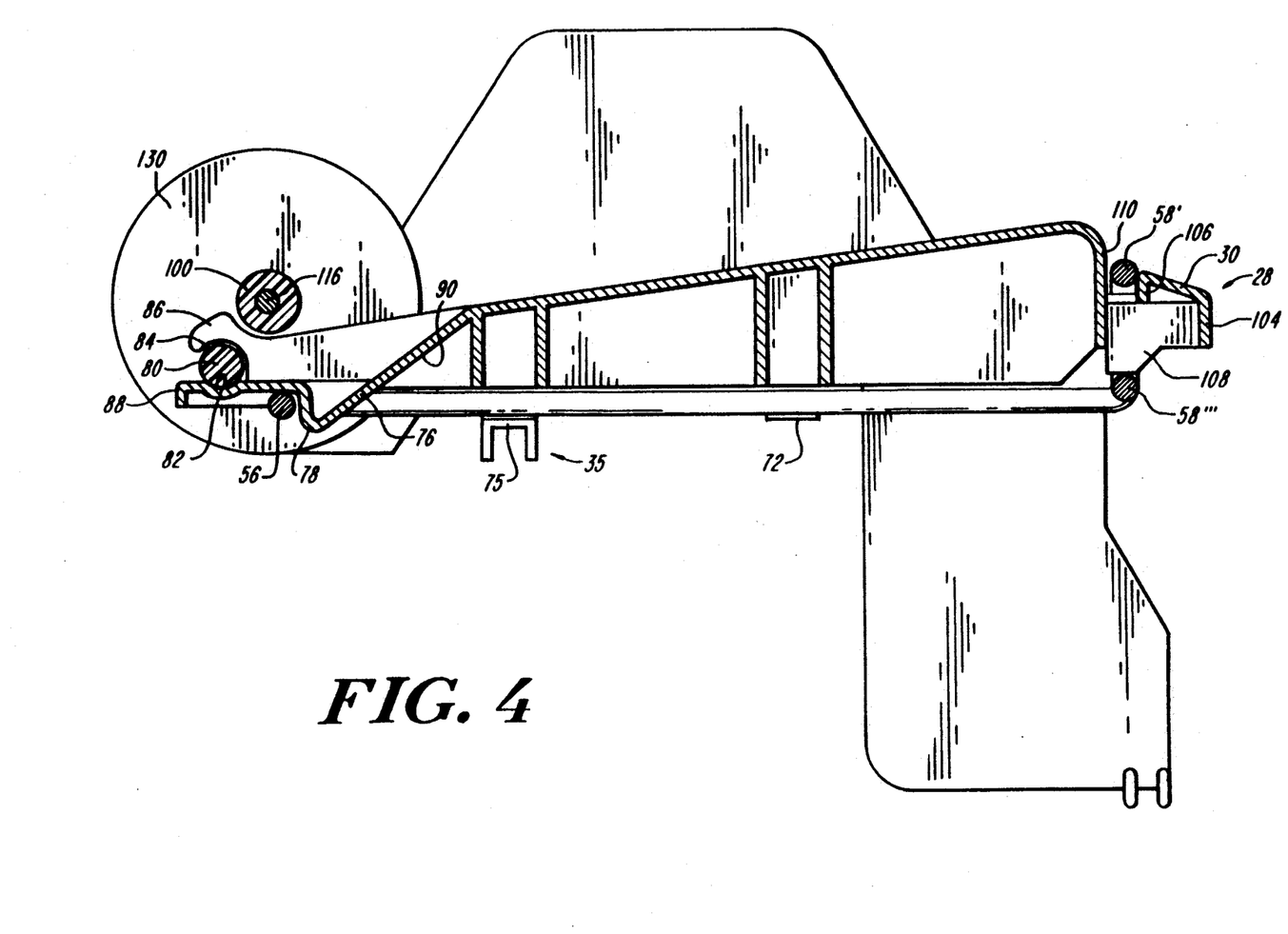
FIG. 4 is a cross-sectional view of FIG. 1 along lines 4—4 showing the locking mechanism attaching the seat to the rack.

The rear locking mechanism 70 is shown in cross-section in FIG. 4. The rear locking mechanism includes a rear biased latch 76 formed integrally with the base 20 of the seat portion 14 and adapted to releasably engage the rear strut 56 via a shoulder 78 to lock the seat portion 14 against rearward movement relative to the rack 12. The rear biased latch 76 in its normal, unbiased position depends downwardly from the bottom of the base 2 toward the rear end of the seat and may be locked in this position against unintentional flexing and disengagement of the shoulder 76 and the rear end strut 56 by a pin 80 which is wedged between the rear biased latch 76 and the base 20 of the seat portion 14. Preferably, the rear biased latch 76 includes a groove 82 on its surface facing the bottom of the seat. A pair of mating grooves 84 are provided on grooved arms 86 integrally formed on the bottom of the seat 10. The transverse groove 82 and the mating grooves 84 cooperate to form a channel for receiving and holding in place the locking pin 80.

Thus, it may be seen that when locking pin 80 is in place, the rear biased latch 76 is not capable of being flexed upwardly toward the bottom of the seat portion 14, and the shoulder 78 of the rear biased latch 76 is secured against unintentional disengagement from the rear end strut 56. When the locking pin 80 is removed, the end 88 of the rear biased latch 76 may be manually forced upwardly toward the seat bottom to lift the shoulder 78 and to bring it above the plane defined by the horizontal platform 52 and out of engagement with the rear end strut 56. Although manual force is needed to disengage the rear biased latch when removing the seat 10 from the rack 12, no such force is necessary when sliding the seat 10 onto the rack 12. As the seat 10 is slid onto the rack 12, the downwardly sloping surface 90 of the rear biased latch 76 contacts the rear end strut 56 which causes the latch 76 to flex upwardly toward the seat bottom. When the shoulder 78 passes beyond the rear end strut 56, the rear biased latch 76 snaps downwardly toward its normal unbiased position and into engagement with the rear end strut 56.

Figure 5:
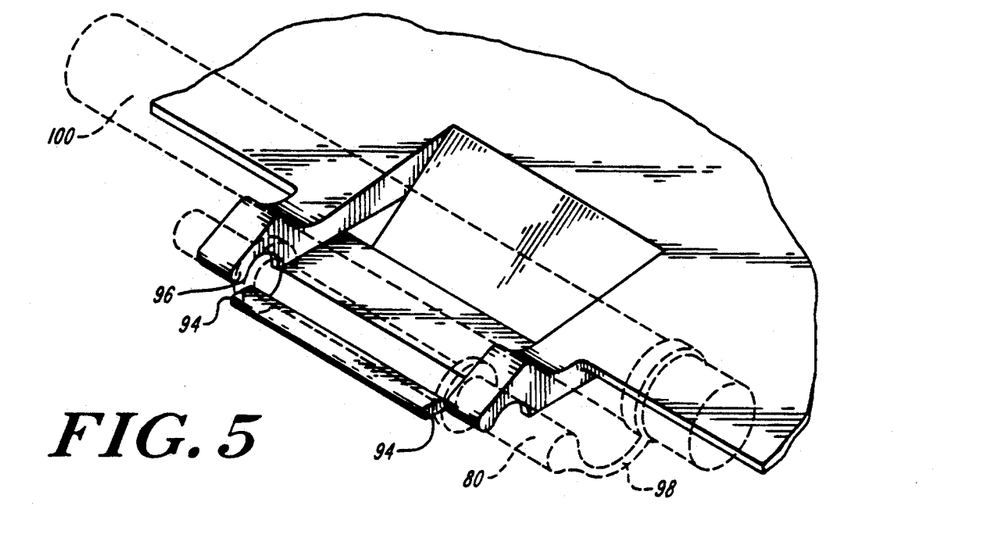
FIG. 5 is a rear view of FIG. 1 showing a latch and locking-pin assembly for attaching the seat to the rack.

Referring to FIG. 5, the side walls 94 of the rear biased latch 76 are spaced from the facing side walls 96 of the grooved arms 86. The locking pin 90 may be provided with annular ridges 92 sized and positioned to be captured in the space between the side walls 94 of the rear biased latch 76 and the facing side walls 96 of the grooved arms 86. The interengagement of the annular ridges 92 and the side walls 94, 96 prevents the locking pin 80 from sliding axially with respect to the rear biased latch 76. The locking pin 80 is loosely attached to the axle cover 100 by a safety cord 98, thereby preventing inadvertent loss of the locking pin 80.

Figure 6:
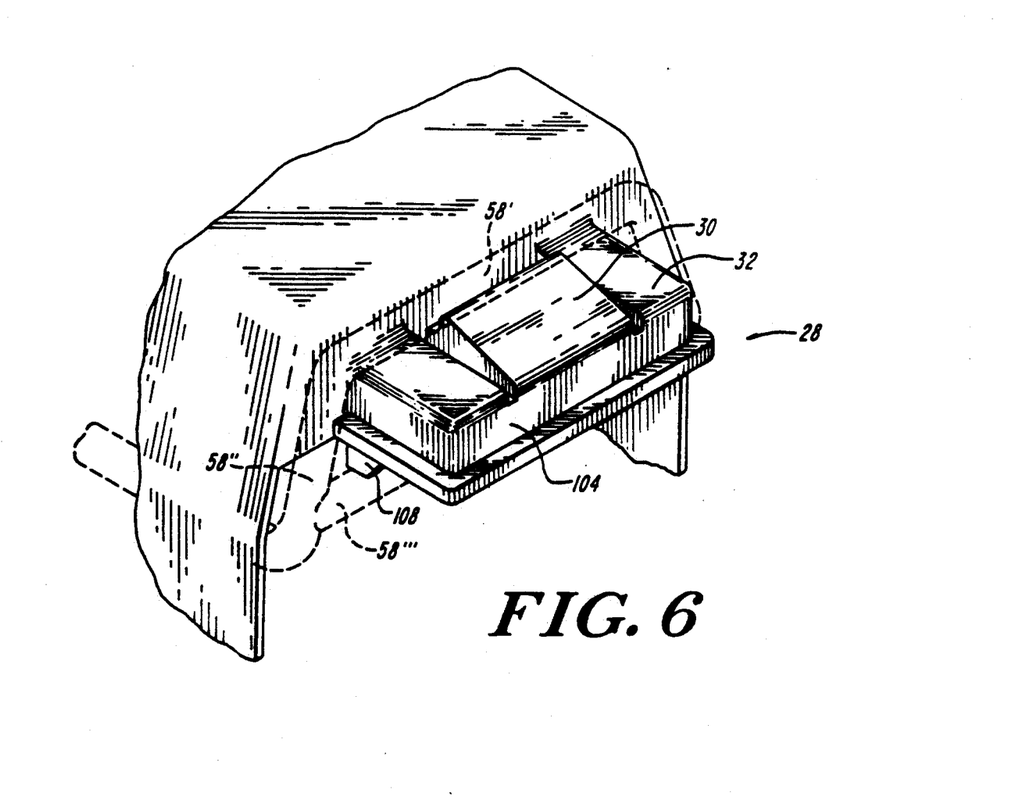
FIG. 6 is a front view of FIG. 1 showing a tongue, slot and latch assembly for attaching the seat to the rack.

The front locking mechanism 68 includes the interengagement of a tongue 28 and the front end strut 58 to limit vertical, forward and rearward movement of the seat relative to the rack. The tongue 28 has an integral, front, biased latch 30. This front biased latch 30 in its normal unbiased position depends upwardly from the leading end 104 of the tongue 28 toward the rear end of the seat and terminates in a downwardly extending shoulder 106 for engaging the strut 5 and limiting rearward movement of the seat 10 with respect to the rack 12. The front biased latch 30 may be manually flexed downwardly until it is substantially flush with the top surface of the tongue 28. This action moves the shoulder 106 out of engagement with the front end strut 58 and allows the tongue 28 to be moved rearwardly with respect to the front end strut 58. No such manual force is required when sliding the seat 10 onto the rack 12. As the seat 10 is slid onto the rack 12, the upwardly sloping surface of the front biased latch 30 contacts the front end strut 58 and flexes downwardly. When the shoulder 106 has passed beyond the front end strut 58, the front biased latch 30 snaps upwardly toward its normal unbiased position and into engagement with the front end strut 58.

In the preferred embodiment, the front end strut 58 has an upper portion 58', side wall portions 58" and a lower portion 58''', which together form a substantially rectangular slot receiving the tongue 28. The tongue 28 may include dogs 108 positioned rearward of its leading end 104, which dogs 108 provide the tongue 28 with a gradually increasing vertical dimension in a direction rearwardly of the leading end 104 of the tongue 28. The leading end 104 of the tongue 28 then is easily passed into the slot formed by the front end strut 58 as there is ample clearance between the vertical dimension of the front end 104 of the tongue 28 and the vertical dimension of the slot. When the tongue is advanced further into the slot, however, the increased vertical dimension of the tongue 28 provided by the dogs 108 results in a snug fit between the tongue 28 and the slot. The upper portion 58' of the front strut 58 then engages the top surface of the tongue 28 and prevents upward movement of the seat 10 relative to the rack 12. The side and upper portions 58''', 58' of the front strut 58 abut the leading end 110 of the seat portion 14 to restrict forward movement of the seat 10 relative to the rack 12.

Figure 7:
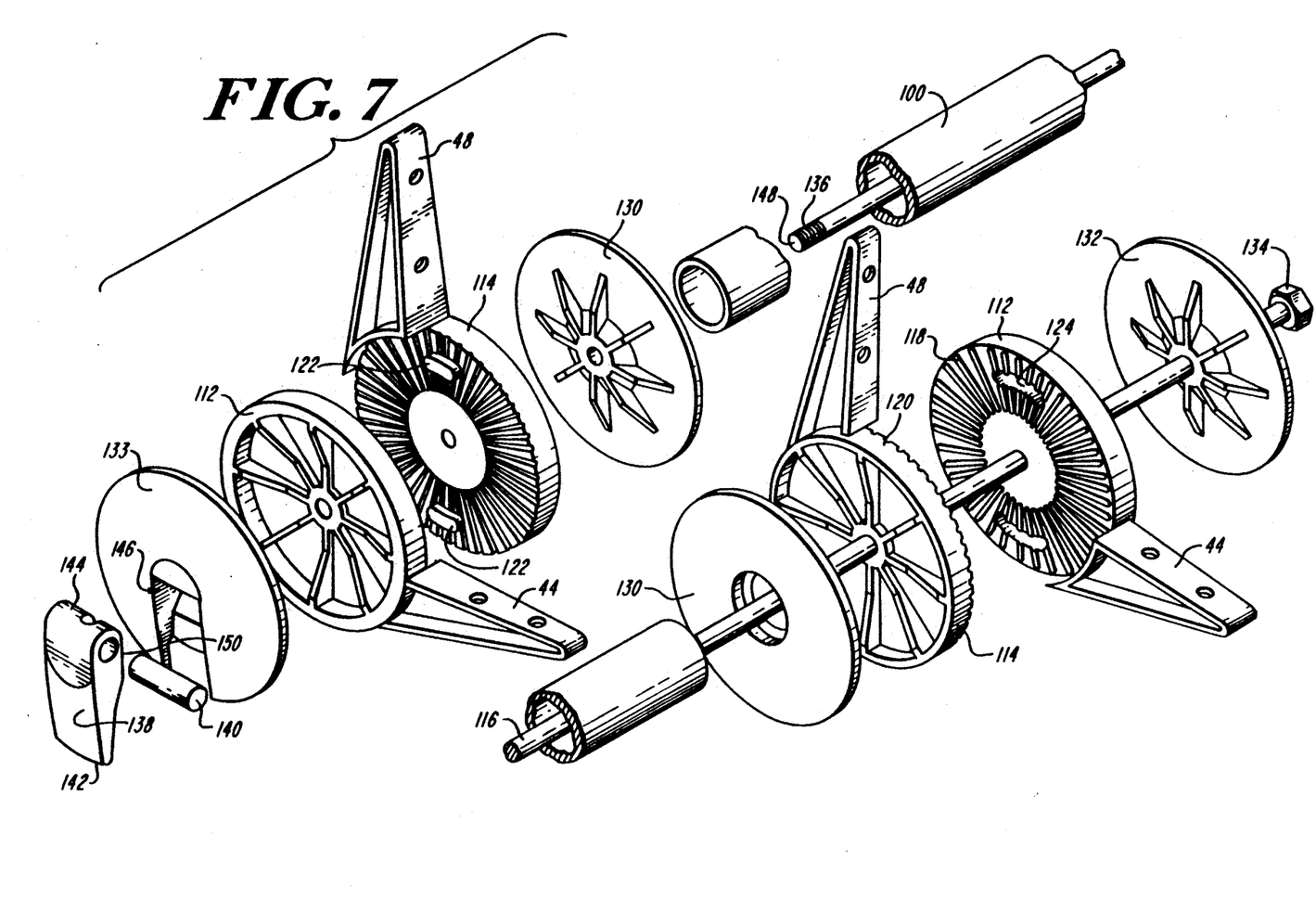
FIG. 7 is an exploded view of the hub assembly of FIG. 2.
Figure 8:
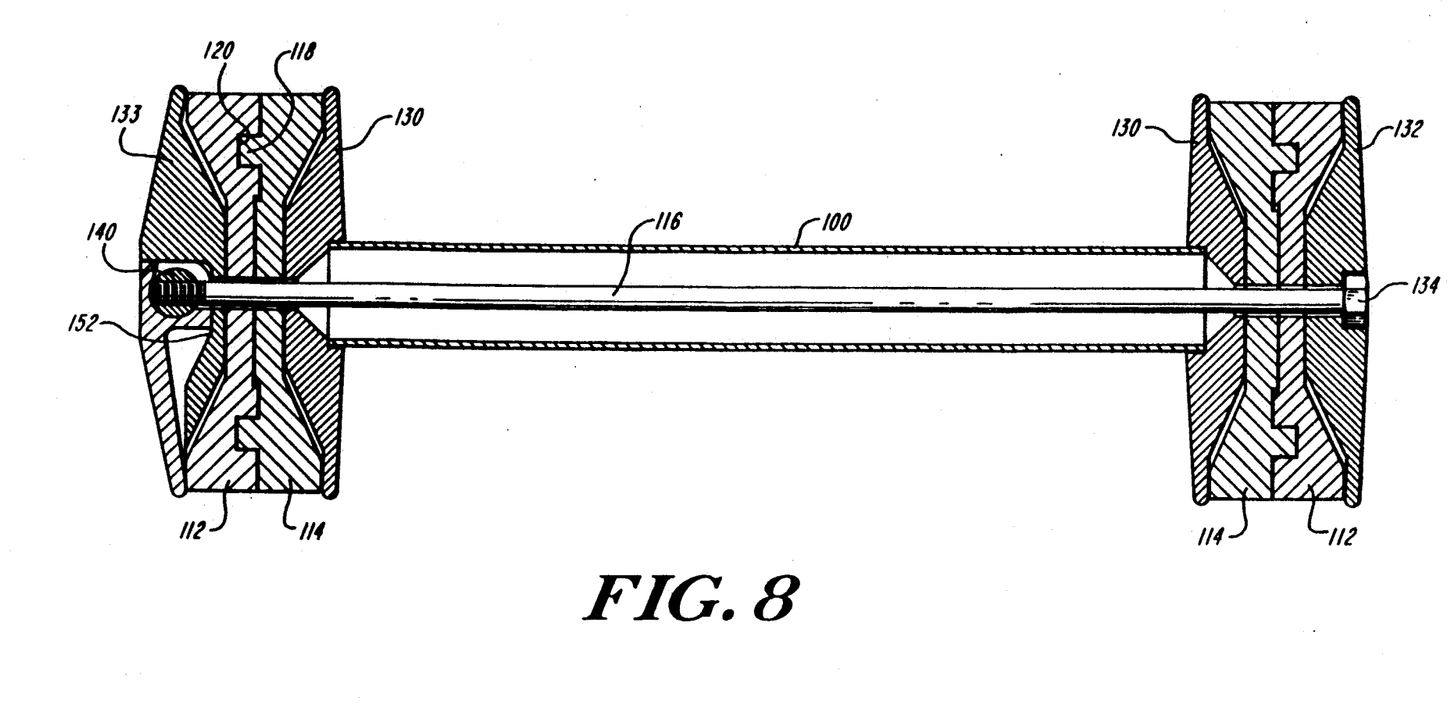
FIG. 8 is a cross-sectional view of the hub assembly of FIG. 2 along lines 8—8.

The seat portion 14 and backrest 16 are attached to one another by hub assemblies 18 which allow the seat portion 14 and backrest 16 to be selectively positioned at various angles with respect to one another. Each hub assembly includes a pair of adjacent hubs, a seat hub 112 and a backrest hub 114 axially aligned on an axle 116 for selective rotation with respect to one another. The facing surfaces of the seat hub 112 and backrest hub 114 include mating hub ridges 118 and hub grooves 120 which allow the seat hub 112 and backrest hub 114 to be locked in various rotational positions with respect to one another when the hub ridges 118 and hub grooves 120 are interengaged. The backrest hub 114 preferably is provided with a stop 122 which, when the hubs are assembled on the axle, mates with a hub channel 124 in the seat hub 112. The stop 122 moves in the hub channel 124 as the hubs 112, 114 are rotated with respect to one another on the axle 116. The ends of the hub channel 124 engage the stop 122 and limit absolutely the extent of rotation of the seat hub 112 and backrest hub 114 with respect to one another. In the preferred embodiment, a relative rotation of about 20° is allowed.

The seat hub 112 includes a seat hub arm 44 integrally formed with and radially extending from the seat hub 112. The backrest hub 114 likewise includes a backrest hub arm 48 integrally formed with and radially extending from the backrest hub 114. These arms are constructed and arranged to fit within the U-shaped reinforcing channels 24 on the seat portion 14 and backrest 16 to attach the seat portion 14 and backrest 16 to the hub assembly 18.

A pair of end plates are positioned on the axle 116 and sandwich the seat hub 112 and backrest hub 114. The end plates cooperate with other features of the hub assembly to hold the seat hub 112 and backrest hub 114 in locking engagement with one another. The portion of the axle 116 positioned between the two inner end plates 130 is surrounded by an axle cover 100. The ends of this axle cover 100 abut the facing surfaces of the inner end plates 130 and restrict the movement of the inner end plates 130 toward one another. At one end of the axle is an integrally formed bolt-shaped axle head 134 which acts as a stop to prevent the adjacent outer end plate 132 from sliding off of the axle head end of the axle 116. The axle head 134 is of conventional octagonal shape and mates with a groove in the adjacent outer end plate 132 so that rotation of this outer end plate translates rotation to the axle 116. The opposite end of the axle 116 has terminal threads 136 provided to mate with an internally threaded tab axle 140 in release tab 138. The release tab acts as a stop to prevent the adjacent outer end plate 133 from sliding off of the tab end 142 of the axle 116. The release tab 138 fits within a groove in the outer end plate 133. Rotation of the outer end plate 133 translates rotation to the release tab 138.

When the hub assembly is assembled as shown in FIG. 2, the outer end plate 133 and its release tab 138 are tightly threaded onto the axle 116. Seat and backrest hubs 112, 114 are sandwiched by the inner and outer end plates 130, 132, 133. The outer end plates 132, 133 exert an inwardly directed force to hold the facing surfaces of the seat and backrest hubs 112, 114 in locking engagement, the hub arms 44, 48 fixed in selective angular relationship to one another.

The release tab 138 is pivotable on the tab axle 140 secured within the groove on the outer end plate 133. When the bottom 142 of the release tab 138 is pivoted outwardly on tab axle 140, the inner end 144 of release tab 138 is aligned with a channel 146 in the outer end plate 133 and the outer end plate 133 is allowed to move slightly outwardly, thereby releasing some of the inwardly directed force holding the hubs together. The outer end plate 133 with attached release tab 138 then may be rotated easily to cause the release tab to be threaded toward the tip 148 of the axle 116. This effectively lengthens the axle and allows the seat and backrest hubs 112, 114 to be disengaged from their locking interengagement and rotated with respect to one another. The seat rest portion 14 and backrest 16 then are allowed to pivot with respect to one another by the relative rotation of the seat hubs and backrest hubs. When the seat portion 14 and backrest 16 are positioned in the desired angular relationship, the outer end plates are rotated with respect to one another to thread the release tab 138 further onto the axle and thereby bring the outer end plates 132, 133 toward one another. Since the inner end plates 130 are fixed against inward movement toward one another by the axle cover 100, the inward movement of the outer end plates 132 forces the seat and backrest hubs 114, 116 toward one another into locking engagement. The bottom 142 of the release tab 138 then is pivoted inwardly to provide further locking force, the inwardly facing wall 150 of the release tab 138 acting as a lever against the groove wall 152 of the outer end plate 133 to force the outer end plate inwardly.

The seat portion 14, backrest 16, seat hub 112, backrest hub 114, inner end plates 130 and outer end plates 132, 133 each may be integrally molded as a single piece. In the preferred embodiment, the seat portion 14 and backrest 16 are molded from polypropylene. The various elements of the seat portion 14 and backrest 16 must be thick enough to provide support and strength, but thin enough to prevent deformation when cooling during the molding process (as is known to those of ordinary skill in the art). The thickness of the various elements ranges from about 2.5 mm to about 4 mm. The front end latch 30 has a thickness of about 2.5 mm, while the rear biased latch has a thickness of about 3 mm. The typical thickness of the U-shaped reinforcing channels 24, support ribs 67 and L-shaped channels 35 also is on the order of about 3 mm. The double flange 40 has a thickness of about 4 mm.

The seat and backrest hubs 112, 114 and the end plates 130, 132, 133 in the preferred embodiment are made from glass reinforced nylon, a rigid material. The axle 116 is metal. The rack 12 preferably is formed of aluminum rods. The central support struts 64 of the preferred embodiment have a diameter of about ⅜ of an inch and the remaining struts have a diameter of about 5/16 of an inch.

It should be understood that various changes and modifications of the embodiment shown in the drawings may be made within the scope of this invention. Thus, it is intended that all matter contained in the above description are shown in the accompanying drawing shall be interpreted in an illustrative and not limiting sense.

What is claimed is:

1. A child's bicycle seat for attachment to a bicycle rack including a substantially rectangular frame having two side struts, a front end strut and a rear end strut, the seat comprising,
    a seat for carrying a child,
    means integral with the seat for slideably engaging the side struts as the seat is being assembled onto the rack and securing the seat against lateral and vertical movement relative to the rectangular frame,
    means integral with the seat and projecting from a forward end of the seat for locking engagement with the front end strut, and
    means integral with the seat and projecting from a rearward end of the seat for engaging the rear end strut and including an integral latch adapted to releasably engage the rear end strut so as to lock the seat against rearward movement relative to the rack.

2. A child's bicycle seat as claimed in claim 1 wherein the latch is a flexible latch and further comprising locking means for locking the latch thereby preventing unintentional flexing of the latch and disengagement of the latch from the rear end strut.

3. A child's bicycle seat as claimed in claim 2 wherein the latch normally depends downwardly from the bottom of the seat and wherein the locking means comprises a wedge adapted to be securely positioned between the latch and the bottom of the seat to lock the latch in its downwardly position.

4. A child's bicycle seat as claimed in claim 3 wherein the latch includes a groove facing a pair of mating grooves on the bottom of the seat, the various grooves cooperating to form a channel for receiving the wedge.

5. A child's bicycle seat as claimed in claim 1 wherein the means projecting from the forward end comprises means arranged to engage the front end strut for limiting both vertical and rearward movement of the seat relative to the rectangular frame, the forward projecting means including an integral flexible latch adapted to releasably engage the front end strut.

6. A child's bicycle seat as claimed in claim 5 wherein the front end strut defines a slot and the forward projecting means forms a tongue for cooperating with the slot on the rack to prevent vertical movement of the seat relative to the rack.

7. A child's bicycle seat as claimed in claim 5 further comprising locking means for locking the rear flexible latch member thereby preventing unintentional flexing and disengagement between the rear latch and the rear end strut.

8. A child's bicycle seat as claimed in claim 5 wherein the seat includes a seat portion and a backrest, and further comprising a pair of hub assemblies pivotably attaching the seat portion and backrest, and
    means associated with the hub assemblies for disengagingly locking the seat portion and backrest in various angular relationships to one another.

9. A child s bicycle seat as claimed in claim 1 wherein the seat includes a seat portion and a backrest, and further comprising a pair of hub assemblies pivotably attaching the seat portion and backrest, and
    means associated with the hub assemblies for disengagingly locking the seat portion and backrest in various angular relationships to one another.

10. A child's bicycle seat as claimed in claim 1 wherein the rack includes a pair of downwardly depending end struts attached to and depending from the rear end strut and a pair of downwardly depending central struts attached to and depending from the side struts at a location forward of the rear end strut, and wherein the slidable engaging means are L-shaped, rack-engaging channels integrally formed with and extending from the bottom of the seat, the channels constructed and arranged for slidably engaging the side struts only between the central depending struts and rear depending struts.

11. A child's bicycle seat for attachment to a bicycle rack including a substantially rectangular frame having two side struts, a front end strut and a rear end strut, comprising,
   a seat for carrying a child,
   means integral with the seat for slideably engaging the side struts as the seat is being assembled onto the rack and securing the seat against lateral and vertical movement relative to the rectangular frame, and
   means for engaging the front end strut and for limiting both vertical and longitudinal movement of the seat relative to the rectangular frame, the engagement means including a latch member formed integrally with the seat and adapted to releasably engage the front end strut so as to lock the seat member against rearward movement relative to the rack.

12. A child's bicycle seat as claimed in claim 11 wherein the engagement means includes a tongue extending forwardly from the seat and wherein the integral biased latch flexible member is formed in the tongue.

13. A child's bicycle seat as claimed in claim 11 wherein the seat includes a seat portion and a backrest, and further comprising,
   a pair of hub assemblies pivotably attaching the seat portion and backrest, and
   means associated with the hub assemblies for disengagingly locking the seat portion and backrest in various angular relationships to one another.

14. A child's bicycle seat and rack assembly, the combination comprising,
   a rack adapted for mounting over a wheel of a bicycle, the rack including a rectangular support platform formed of at least a pair of side struts, a front end strut and a rear end strut connecting the side struts, a pair of end support struts attached to and downwardly depending from the rear end strut, and a pair of central support struts attached to and downwardly depending from the side struts forward of the rear end strut,
   a seat slidably attached to the rack for carrying a child,
   a pair of facing, spaced-apart, L-shaped rack engaging channels integrally formed with and extending from the bottom of the seat, the channels constructed and arranged to slidably engage the side struts only between the points of attachment of the central support struts and the rear end strut, the end support struts being attached to the rear strut inwardly of the side struts to provide clearance for the L-shaped channels as the seat is slid onto the rack, and
   means integrally formed with the seat member to releasably engage one of the front and rear end struts to restrict rearward movement of the seat relative to the rack.

15. A child's bicycle seat and rack assembly as claimed in claim 14 wherein the releasably engaging means projects from a rearward end of the seat for engaging the rear end strut and includes an integral, biased latch adapted to releasably engage the rear strut so as to lock the seat member against rearward movement relative to the rack.

16. A child's bicycle seat and rack assembly as claimed in claim 15 further comprising locking means for locking the latch thereby preventing unintentional flexing and disengagement between the latch and the rear end strut.

17. A child's bicycle seat and rack assembly as claimed in claim 14 wherein the releasable engaging means is integral with and projects from a forward end of the seat above a plane defined by the side struts for engaging the front end strut and includes an integral latch member adapted to releasably engage the front end strut to lock the seat member against rearward movement relative to the rack.

18. A child's bicycle seat and rack assembly as claimed in claim 17 wherein the front end strut engaging means includes a tongue integrally formed with and extending from the forward end of the seat, the integral latch member is formed in the tongue, and the front strut forms a slot for receiving the tongue in snug relation, whereby the slot and tongue cooperate to prevent vertical movement of the seat relative to the rack.

19. A child's bicycle seat and rack assembly as claimed in claim 14 further comprising buttress means positioned forward of the channel means for slidably engaging the side struts, the buttress means formed integrally with and extending downwardly from the bottom of the seat.

20. A child's bicycle seat and rack assembly as claimed in claim 19 wherein the buttress means comprises opposed walls of integrally formed leg channels of the seat.

21. A child's bicycle seat adapted to be attached to a bicycle comprising,
   a seat portion,
   a backrest,
   a pair of axially aligned hub assemblies pivotably attaching the seat portion and backrest,
   means associated with the hub assemblies for selectively securing the seat portion and backrest in various angular relationships to one another,
   means associated with the seat for securing the seat to a bicycle, wherein each of the hub assemblies includes a seat hub with a radially extending arm integrally formed with the seat hub and a backrest hub with a radially extending arm integrally formed with the backrest hub, and wherein the seat and backrest include integrally formed channels for receiving said arms, and
   further comprising means for securing the arms within the channels, wherein the seat portion and backrest have side walls, and wherein the channels comprise reinforced, substantially U-shaped grooves integrally molded with said side walls.

22. A child's bicycle seat assembly for attachment to a bicycle rack, comprising,
   a rack with a plurality of struts for attachment to a bicycle including struts carried and arrayed in a rectangular flat configuration with at least several struts extending downwardly from side struts forming the sides of the rectangle, a seat, means integrally formed on the bottom of the seat for detachably securing the seat to the rack, said securing means including a plurality of means for slidably engaging the side struts to limit lateral movement of the seat relative to the rack and a plurality of means for engaging the rack to limit longitudinal and vertical movement of the seat relative to the rack, the plurality of means including a tongue integrally formed with the seat and projecting forwardly of the seat and means for engagement by a strut including a flexible detent which on application of hand force may be disengaged from the strut.

* * * * *

UNITED STATES PATENT AND TRADEMARK OFFICE
CERTIFICATE OF CORRECTION

PATENT NO. : 5,299,818
DATED : April 5, 1994
INVENTOR(S) : Dixon Newbold

It is certified that error appears in the above-identified patent and that said Letters Patent is hereby corrected as shown below:

Col. 9
  In claim 12, line 4, insert --flexible-- before "latch" and delete "flexible" after "latch".
Col. 10
  In claim 15, lines 4 and 5, delete ", biased".

Signed and Sealed this

Sixteenth Day of August, 1994

Attest:

BRUCE LEHMAN

Attesting Officer

Commissioner of Patents and Trademarks